(12) United States Patent
Kotrla et al.

(10) Patent No.: US 7,836,201 B2
(45) Date of Patent: Nov. 16, 2010

(54) METHODS AND SYSTEMS FOR PROVIDING EFFICIENT PROVISIONING OF DATA FLOWS

(75) Inventors: Scott R. Kotrla, Wylie, TX (US); Christopher N. Del Regno, Rowlette, TX (US); Matthew W. Turlington, Richardson, TX (US); Michael U. Bencheck, Richardson, TX (US); Richard C. Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 11/925,246

(22) Filed: Oct. 26, 2007

(65) Prior Publication Data

US 2009/0113071 A1   Apr. 30, 2009

(51) Int. Cl.
*G06F 15/16* (2006.01)
(52) U.S. Cl. .................. 709/234; 709/203; 709/224
(58) Field of Classification Search .......... 709/234, 709/203, 224, 225
See application file for complete search history.

(56) References Cited

U.S. PATENT DOCUMENTS

| | | | |
|---|---|---|---|
| 6,775,701 B1 | 8/2004 | Pan et al. | |
| 7,215,644 B2 * | 5/2007 | Wu et al. | 370/248 |
| 2004/0125815 A1 * | 7/2004 | Shimazu et al. | 370/411 |
| 2005/0135804 A1 * | 6/2005 | Rashid et al. | 398/4 |
| 2005/0207343 A1 * | 9/2005 | Han | 370/235 |
| 2007/0171826 A1 * | 7/2007 | Roberts et al. | 370/235 |
| 2007/0177506 A1 | 8/2007 | Singer et al. | |
| 2009/0007148 A1 * | 1/2009 | Czerwinski et al. | 719/320 |

OTHER PUBLICATIONS

Notification of Transmittal of the International Search Report and the Written Opinion of the International Searching Authority, or the Declaration, dated Dec. 24, 2008.

* cited by examiner

*Primary Examiner*—Ario Etienne
*Assistant Examiner*—El Hadji M Sall (57) ABSTRACT

A system and method may include receiving a new flow request, the new flow request for requesting provisioning of a flow between a computer and the server, identifying a path of one or more network elements between the computer and the server, and determining whether provisioning the flow between the computer and the server violates a constraint. The system and method may further include updating an oversubscription factor and available bandwidth for an interface of each of the one or more network elements in the event the constraint is not violated, and determining whether a second path exists between the computer and the server in the event the constraint is violated.

21 Claims, 4 Drawing Sheets

METHODS AND SYSTEMS FOR PROVIDING EFFICIENT PROVISIONING OF DATA FLOWS

BACKGROUND INFORMATION

Traffic engineers monitor data throughput across network devices, such as routers and switches. In many instances, the network devices may be oversubscribed in an attempt to improve data throughput. Oversubscribing may refer to the situation where a network provider sells more bandwidth to customers than the network devices can provide based on the low likelihood that all of the customers will be using all of their purchased bandwidth at the same time. In conventional systems, an oversubscription factor is statically assigned to each interface on a network device based on the experience of a traffic engineer. For example, an interface of a network device may be set to a bandwidth of one gigabit per second (1 Gbps) with an oversubscription factor of 2:1 allowing for up to 2 Gbps of bandwidth to be provisioned across the interface.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include receiving a new flow request, the new flow request for requesting provisioning of a flow between a computer and a server, identifying a path of one or more network elements between the computer and the server, and determining whether provisioning the flow between the computer and the server violates a constraint. The system and method may further include updating an oversubscription factor for an interface of each of the one or more network elements in the event the constraint is not violated, and determining whether a second path exists between the computer and the server in the event the constraint is violated.

The description below describes servers, computers, and network elements that may include one or more modules, some of which are explicitly shown in the figures, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, computers, etc.) separately. The functions described as being performed at various components may be performed at other components, and the various components may be combined and/or separated. Other modifications also may be made.

Figure 1:
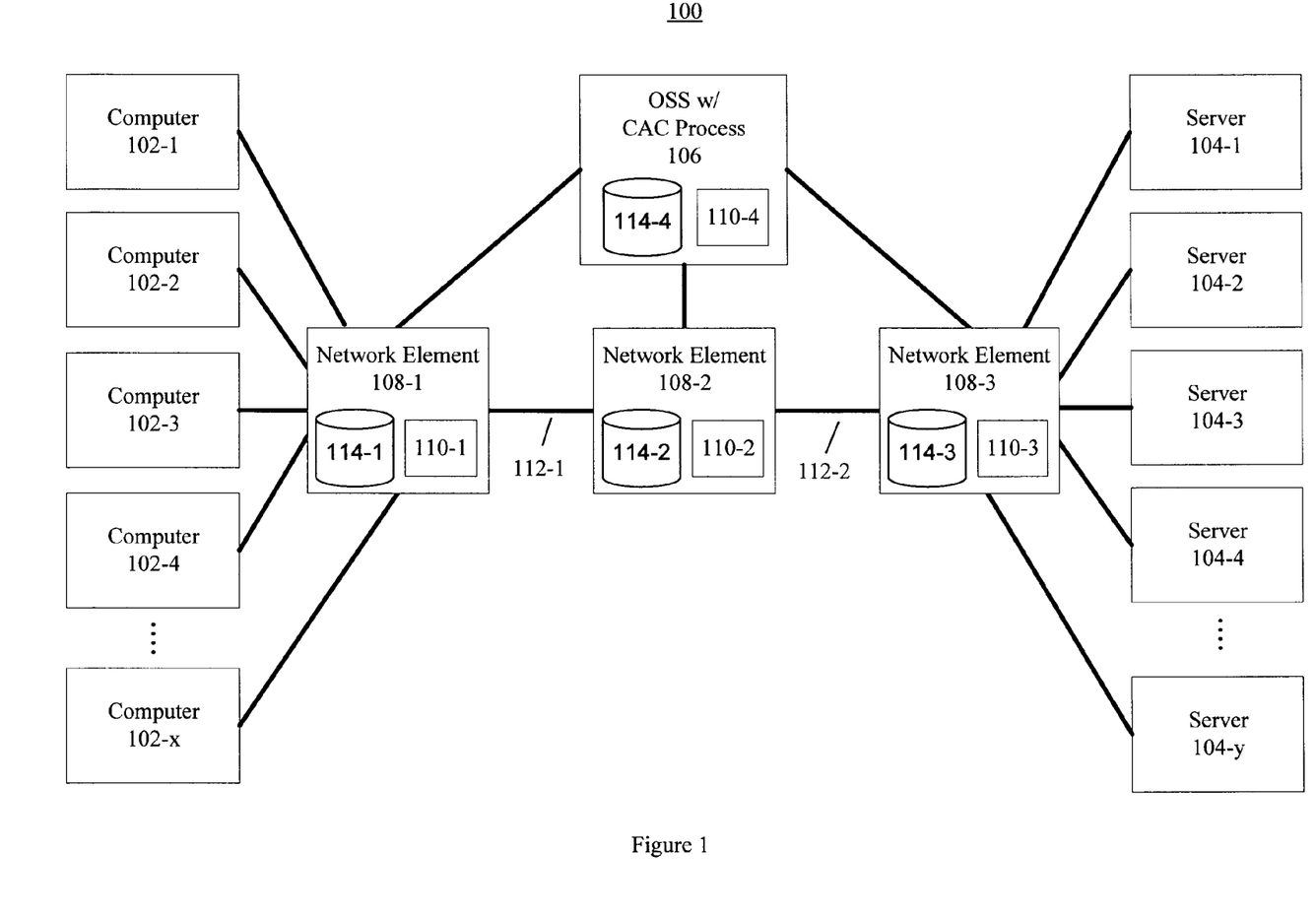
FIG. 1 illustrates a system for providing efficient provisioning of data flows in accordance with exemplary embodiments.

FIG. 1 illustrates a system for providing efficient provisioning of data flows in accordance with exemplary embodiments. The system 100 may provide for intelligent oversubscription of data flows across network elements. The system 100 may adjust an oversubscription factor for interfaces of the network elements to add and remove flows across the network elements to reduce the likelihood of data loss, to reduce data latency, and to improve link utilization. In an exemplary embodiment, a flow may be an amount of bandwidth provisioned for data traffic between two devices that is purchased by a customer from a network provider. The flow may transport data, such as, but not limited to, Internet Protocol (IP) packets, Ethernet frames, Pseudowires, or any data that may be transported across a telecommunications network.

For example, a customer may purchase ten megabits of bandwidth per second across a network between a computer and a server. Without oversubscription, the amount of bandwidth allocated to the customer would be ten megabits of bandwidth per second regardless of how much bandwidth the customer actually used at any time. Generally, the customer may purchase some amount of bandwidth with a reasonable expectation of being able to use that amount of bandwidth at least under normal operating conditions. Limiting access to this bandwidth and not oversubscribing, however, may lead to low utilization of network elements. The system 100 in accordance with exemplary embodiments may improve utilization of network elements by efficiently and dynamically adjusting an oversubscription factor while minimizing latency and packet loss.

In an exemplary embodiment, the system 100 may include one or more computers 102-1, 102-2, . . . 102-x, one or more servers 104-1, 104-2, . . . 104-y, network element 108-1 to network element 108-3, and an operations support system (OSS) 106. The system 100 may provision flows between the computers 102 and the servers 104 across a group of network elements 108 that form a network. The network elements 108 may be routers, switches, other devices capable of communicating data via a network, and/or combinations thereof. Each network element 108 may include one or more interfaces that may communicate data traffic at a particular rate. In an exemplary embodiment, the interfaces may be MultiProtocol Label Switching (MPLS) interfaces that may be capable of providing a predetermined amount of bandwidth per second for data communication. The network elements 108 may communicate with one another, the computers 102, and the servers 104 using wired and/or wireless links 112 that are communicatively coupled to the interfaces of the network elements 108.

It is noted that each of the links in FIG. 1 are depicted as being a single line, however, each line may represent one or more links to communicate data between the computers 102, the network elements 108, the servers 104, the operations support system (OSS) 106, and/or combinations thereof. The operations support system (OSS) 106 may be a provisioning server or other device capable of managing and provisioning flows over a network. The servers 104 may be communication servers for communicating data with the computers 102.

It is noted that system 100 illustrates a simplified view of various components included in a communication system, and that other hardware devices and software not depicted may be included in the system 100. It is also noted that the system 100 illustrates only a single operations support system (OSS) 106 and three network elements 108. It will be appreciated that multiple instances of these devices may be used. Also, the operations support system (OSS) 106 and the server 104 may be combined. Moreover, the system 100 may include other devices not depicted in FIG. 1.

The system 100 may statistically multiplex data received from the computers 102 and/or servers 104 over links at the network elements 108 for communication across the network elements 108. For example, the network element 108-1 may receive data from each of the computers 102-1 to 102-x, may multiplex the received data, and may communicate the multiplexed data across link 112-1. Prior to reaching the destination, a network element 108 may demultiplex the multiplexed data and may communicate the demultiplexed data to the appropriate server 104. For example, computer 102-1 may exchange data with server 104-1 and computer 102-2 may exchange data with server 104-2. The network element 108-1 may receive data from computer 102-1 and 102-2, may multiplex the data from the respective computers 102-1 and 102-2, and may communicate the multiplexed data across link 112-1. Network element 108-3 may receive the multiplexed data via network element 108-2 and link 112-2. The network element 108-3 may demultiplex the multiplexed data for communication to the server 104-1 and 104-2, respectively. The data from computer 102-1 may be demultiplexed and may be communicated to the server 104-1, and the data from computer 102-2 may be demultiplexed and may be communicated to the server 104-2.

In many instances, the system 100 may oversubscribe the interfaces of the network elements 108 to increase network utilization across the network elements 108. Statistical multiplexing is based on the expected low probability that all computers 102 and servers 104 on a network will send traffic at the same time. The expected low probability that all computers 102 and servers 104 on a network will send traffic at the same time also may be referred to as statistical burstiness of data traffic. From the network provider's perspective, the system 100 may be implemented with the expectation that not every computer 102 and/or server 108 may be using all of the bandwidth allocated in the respective flows at any given time.

Instead of provisioning exactly the amount of bandwidth of the flows corresponding to the rate at which the interfaces of the respective network elements 108 may handle the data traffic (e.g., provisioning flows totaling up to one gigabit per second for interfaces of the network elements 108 that may process up to one gigabit per second of data traffic), the system 100 may provision a number of flows having a bandwidth totaling an amount greater than the rate of the interfaces of the network elements 108. The amount of oversubscription provided in the system 100 in accordance with exemplary embodiments may vary based on the size of the flows.

Flows that are large relative to the rate of the interface of a network element 108 have an impact on realizable lossless oversubscription. Lossless oversubscription is the situation when no packets are lost due to a network element 108 receiving more traffic than can be processed. The system 100 in accordance with exemplary embodiments may automatically attempt to provide lossless oversubscription as the flows traversing a network element 108 change over time while maintaining high utilization of the network elements 108.

In instances where the oversubscription factor on an interface of a network element 108 is statically set to the same value to cover all cases (i.e., many large flows, many small flows, a combination of large and small flows), the oversubscription factor is likely too small if there are many small flows traversing the network element 108, which results in low utilization of the interface of the network element 108. In contrast, if the network element 108 is expected to receive many small flows and the oversubscription factor is statically set based on this assumption, the oversubscription factor for the interface of the network element 108 is likely too high, which may result in latency and packet loss if there are many large flows traversing the network element 108. For example, packet loss may occur when an interface of a network element 108 having a rate of one gigabit per second (Gbps) includes a 2:1 oversubscription factor and a one Gbps flow has been provisioned across the interface. If the one Gbps flow at any time uses the entire one Gbps of capacity, latency and packet loss may occur at the interface if any additional flows communicate data during the same time interval. To overcome these problems with static oversubscription factors, the system 100 may dynamically adjust the oversubscription factor to improve latency and packet loss, and to maintain a high level of utilization of the network elements 108.

In an exemplary embodiment, the system 100 may provision flows based on receiving "new flow" requests. The provisioning of new flows may use new flow processing, such as, but not limited to, call admission control (CAC) processing. The new flow processing may consider bandwidth availability on links 112 between the network elements 108 and also may consider an oversubscription factor for each of the interfaces of the network elements 108 to determine whether to provision a new flow.

Before provisioning a new flow, a computer 102 and/or server 104 may request to establish a new flow by communicating a new flow request to the operations support system (OSS) 106. For example, the new flow request may be a call admission control (CAC) request. The new flow request may identify the computer 102 and/or server 104 sending the request (i.e., the requesting device), and the computer 102 and/or server 104 with which the requesting device is requesting to communicate (i.e., the target device). In an exemplary embodiment, computer 102-1 may generate a new flow request that identifies server 104-1 to request that a flow be provisioned therebetween. In another exemplary embodiment, server 104-1 may generate a new flow request that identifies computer 102-1 to request that a flow be provisioned therebetween. The following describes the requesting device as being the computer 102 and the target device as being the server 104. It is noted, however, that the requesting device may be the server 104 and the target device may be the computer 102. After the operations support system (OSS) 106 receives the new flow request, the system 100 may attempt to statically or dynamically provision a new flow between the requesting computer 102 and the target server 104.

In statically provisioned networks, the operation support system (OSS) 106 may perform new flow provisioning processing, such as, but not limited to, call admission control (CAC) processing for each of the network elements 108 within the network. The operations support system (OSS) 106 may include a provisioning module 110-4 and a traffic database 114-4. Upon receipt of the new flow request, the provisioning module 110-4 may query the traffic database 114-4 to identify one or more paths across the network elements 108 for a new flow between the requesting computer 102 and the target server 104. In an exemplary embodiment, the operations support system (OSS) 106 may use a path selection algorithm, such as, but not limited to, Open Shortest Path First, to identify one or more paths for the new flow between the requesting computer 102 and the target server 104. It is noted that FIG. 1 illustrates a single path between the computers 102 to the servers 104 via network elements 108-1, 108-2, and 108-3. Only a single path is shown for clarity as the system 100 may include additional network elements 108 to provide multiple paths. Also, the lines between the devices representing the links (i.e., links between computers 102 and network element 108-1, link between network element 108-1 and network element 108-2, and so forth) may be understood to include one or more links over which a distinct path may be identified. For example, link 112-1 may represent three different links between network element 108-1 and network element 108-2. Each of the three different links may potentially be considered as a part of a different path between network element 108-1 and network element 108-2.

Once one or more paths are identified, for each identified path, the provisioning module 110-4 may query the traffic database 114-4 to examine the flows already provisioned on the links 112 between the network elements 108 on the path. The traffic database 114-4 may include information identifying the rate of each interface of the network elements 108, and the bandwidth used and/or available on the interfaces of the network elements 108 and/or on the links 112. The traffic database 114-4 may respond to the query with the amount of available bandwidth at each of the interfaces of the network elements 108 and/or at the links 112 for each path. The provisioning module 110-4 may determine whether each of the network elements 108 and links 112 on at least one path have sufficient available bandwidth to support the new flow, as will be discussed in further detail below. If a path having sufficient available bandwidth is identified between the requesting computer 102 and the target server 104, the provisioning module 110-4 may provision a new flow to permit the computer 102 to communicate with the server 104 via the network elements 108 on the path. Thus, if the operations support system (OSS) 106 is statically provisioning each network element 108 along the path, then the system 100 does not require signaling between the network elements 108 when attempting to identify an available path because the operations support system (OSS) 106 may have all of the bandwidth information for each of the network elements 108 to determine whether a path is available across the network elements 108 on the path.

In dynamic provisioning, instead of the operations support system (OSS) 106 provisioning a new flow, the operations support system (OSS) 106 may communicate with the network elements 108 to dynamically identify one or more paths for provisioning a new flow. In an exemplary embodiment, when the new flow request is received from the requesting computer 102, the operations support system (OSS) 106 may communicate the new flow request to the end-point network elements 108 respectively closest to the requesting computer 102 and the target server 104. For example, network element 108-1 in FIG. 1 may be considered an end-point network element 108 because network element 108-1 is closest to the requesting computer 102, and network element 108-3 in FIG. 1 may be considered an end-point network element 108 because network element 108-3 is closest to the target server 104. It is noted however, that the end-point network elements 108 need not be the network elements 108 respectively closest to the requesting computer 102 and the target server 104.

Once the end-point network elements 108 are identified, the provisioning modules 110-1 and 110-3 of the end-point network elements 108 may respectively determine whether network elements 108-1 and 108-3 have sufficient available bandwidth to support the new flow. If the network elements 108-1 and 108-3 do not have sufficient bandwidth, the end-point network elements 108 may communicate a "deny new flow" message to the operations support system (OSS) 106, and the operations support system (OSS) 106 may attempt to identify other end-point network elements 108. If none can be found, then the operations support system (OSS) 106 may communicate a "reject new flow" message to the requesting computer 102. If the end-point network elements 108 have sufficient bandwidth, the end-point network elements 108 may communicate the new flow request to other intermediate network elements 108 between the requesting computer 102 and the target server 104 to attempt to identify one or more available paths.

When the new flow request is received at a particular intermediate network element 108 (e.g., network element 108-2), the provisioning module 110 may determine whether the particular intermediate network element 108 includes sufficient bandwidth to accommodate the new flow. The provisioning module 110 of the intermediate network element 108 may query the traffic database 114 to determine whether sufficient bandwidth is available to accommodate the new flow. For example, the network element 108-2 may receive the new flow request from network element 108-1 and may query traffic database 114-2 to determine whether sufficient bandwidth is available to accommodate the new flow. If the intermediate network element 108 has sufficient bandwidth, the intermediate network element 108 may communicate an acceptance message to the preceding network element 108 and may forward the new flow request to the next network element 108 in the direction of the target server 104 in an attempt to identify an available path between the requesting computer 102 and the target server 104. If the intermediate network element 108 does not have sufficient bandwidth, the intermediate network element 108 may communicate a deny new flow message to the preceding network element 108 and the preceding network element 108 may attempt to identify another path. If another path cannot be identified, the preceding network element 108 may communicate a deny new flow message to one or both of the end-point network elements 108, which may communicate a reject new flow message to the requesting computer 102 and/or to the operations support system (OSS) 106 indicating that a new flow cannot be provisioned at this time.

In an exemplary embodiment, for a dynamically provisioned MultiProtocol Label Switching (MPLS) network, the network elements 108 may identify a path using a routing protocol, such as, but not limited to, Open Shortest Path First-Traffic Engineering (OSPF-TE) and may signal total bandwidth and available bandwidth on each link 112 to the network elements identified on the path. If the oversubscription factor of an interface at one or more network elements 108 changes, and therefore the total bandwidth being used by a link 112 changes, either by an internal calculation on the network elements 108 (i.e., dynamic provisioning) or via a provisioning command from the operations support system (OSS) 106 (i.e., static provisioning), each network element 108 may update the respective traffic databases 114 with the new bandwidth values for the link 112 and may communicate the new bandwidth values to the other network elements 108 in the network and/or to the operations support system (OSS) 106 using the routing protocol. For example, the total bandwidth utilized on the link 112-2 between the network element 108-2 and 108-3 may increase, and the network element 108-2 may update traffic database 114-2 with the new bandwidth value, and the network element 108-2 may communicate a bandwidth update message to the network elements 108-1 and 108-3 and to the operations support system (OSS) 106 to update their respective traffic databases 114-1, 114-3, and 114-4 with the new bandwidth value for link 112-2.

In provisioning new flows on one or more network elements 108 along a path and/or adding new flows into a MPLS tunnel across the interfaces of one or more network elements 108, the one or more network elements 108 may locally update the oversubscription factor, as there may not involve signaling to other network elements 108 in the network when bandwidth changes. For example, a MPLS Label Switched Path (LSP) of an aggregate amount of bandwidth may be signaled between two network elements 108 in the network and flows may be Call Admission Controlled into a tunnel at the endpoint network elements 108 based on a tunnel oversubscription factor and a tunnel bandwidth. Also, if a current tunnel does not have sufficient bandwidth to support a new flow, the network elements 108 may automatically attempt to signal to establish a larger tunnel, which may or may not involve changes in an oversubscription factor for one or more of the interfaces of the network elements 108.

The following describes calculations used to determine whether a new flow may be provisioned in accordance with exemplary embodiments. Instead of configuring a single fixed oversubscription factor for an interface of a network element 108 having a rate 'L,' the network elements 108 in accordance with exemplary embodiments may have a dynamic oversubscription factor 'n.' The oversubscription factor may be the amount of bandwidth provisioned across an interface of an network element 108 divided by the maximum amount of bandwidth the interface of the network element 108 may process (i.e., the rate L of the interface). The dynamic oversubscription factor may be based on the following equation:

Oversubscription Factor equation:

$$n = \frac{\sum_{i=0}^{n} LF_i + \sum_{m=0}^{p} SF_m}{L},$$

where $LF_0, LF_1, \ldots LF_n$ is the set of all flows having a flow rate greater than or equal to rate 'a,' where n=0, 1, 2, 3, ... n, and $SF_0, SF_1, \ldots SF_m$ is the set of all flows having a flow rate less than rate a, where m=0, 1, 2, 3, ... p, where rate a is adjustable. In an exemplary embodiment, rate a may be a percentage of the maximum rate of the interface of the network element 108. For example, the network element 108 may operate at a maximum rate of 1,000 Megabits per second (Mbps), and rate a may be 50% of the maximum rate (i.e., 500 Mbps). Thus, flows at rates of 500 Mbps or higher may be considered large, and flows at rates less than 500 Mbps may be considered small. Also, rate a may be set to the rate of the largest flow provisioned across a network element 108, a rate of the second largest flow provisioned across a network element 108, and so forth.

In an exemplary embodiment, the large flows LF may have a large flow oversubscription factor 'x' and the small flows SF may have a small flow oversubscription factor 'z' for small flows. For example, an experienced traffic engineer may select the large flow and the small flow oversubscription factor. The system 100 also may automatically adjust the large flow and the small flow oversubscription factors based on network traffic conditions such as, but not limited to, the number and size of the provisioned data flows. New flows may be provisioned across an interface of a network element 108 so long as the calculated dynamic oversubscription factor n satisfies the following constraint:

Constraint equation:

$$\frac{\sum_{i=0}^{n} LF_i}{x} + \frac{\sum_{m=0}^{p} SF_m}{z} \le L.$$

Thus, as $$\frac{\sum_{i=0}^{n} LF_i}{x} \rightarrow L, \text{ then } \frac{\sum_{m=0}^{p} SF_m}{z} \rightarrow 0.$$

In that situation, then $$n \rightarrow \frac{\sum_{i=0}^{n} LF_i + \sum_{m=0}^{p} SF_m}{L} = x,$$

which is the large flow oversubscription factor.

Also, as $$\frac{\sum_{m=0}^{p} SF_m}{z} \rightarrow L, \text{ then } \frac{\sum_{i=0}^{n} LF_i}{x} \rightarrow 0.$$

In that situation, then $$n \rightarrow \frac{\sum_{i=0}^{n} LF_i + \sum_{m=0}^{p} SF_m}{L} = z,$$

which is the small flow oversubscription factor. If it is assumed that the large flow oversubscription factor x is smaller than the small flow oversubscription factor z, then $x \le n \le z$.

Before deciding whether to provision a new flow, the operations support system (OSS) 106 in static provisioning and/or the network elements 108 in dynamic provisioning may determine whether adding the new flow to the existing flows would violate the Constraint equation.

If adding the new flow would violate the Constraint equation, the oversubscription factor for an interface of each network element 108 may not be changed and the operations support system (OSS) 106 and/or the network element 108 may send a deny new flow message indicating that the new flow cannot be added and/or may send a deny new flow message instructing the preceding network element 108 to attempt to identify an alternative path through a different network element 108. If adding the new flow would not violate the Constraint equation, the operations support system (OSS) 106 and/or the network element 108 may calculate the new dynamic oversubscription factor 'n' using the oversubscription factor equation for the interface of the network element 108, may update the respective traffic databases 114, and may communicate an acceptance message to the operations support system (OSS) 106 and/or the other network elements 108 on the path. Once all the oversubscription factor has been updated at an interface of each network element 108, the operations support system (OSS) 106 and/or the network elements 108 may allocate the bandwidth to provision the new flow and may communicate a provisioned message to inform the requesting computer 102 that the flow has been provisioned, thereby permitting the computer 102 and the server 104 to communicate data via the provisioned flow. Thus, the system 100 may efficiently provision new flows to improve utilization and to minimize packet latency and/or loss.

Figure 2:
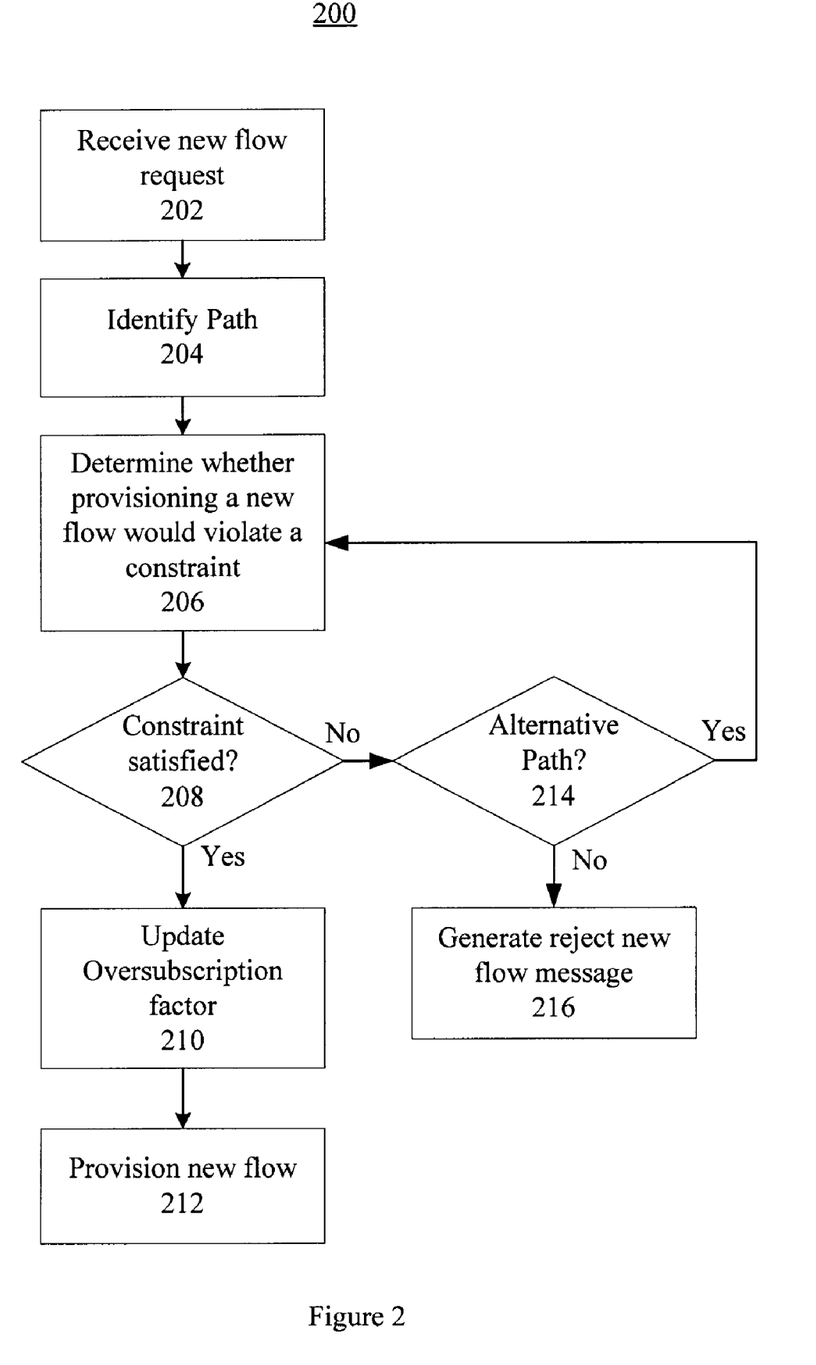
FIG. 2 illustrates a method for new flow provisioning in accordance with exemplary embodiments.

FIG. 2 illustrates a method for performing new flow provisioning in accordance with exemplary embodiments. This exemplary method is provided by way of example, as there are a variety of ways to carry out methods disclosed herein. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2. Each block shown in FIG. 2 represents one or more processes, methods, or subroutines carried in the exemplary method 200. Referring to FIG. 2, the exemplary method 200 may begin at block 202.

In block 202, the method 200 may include receiving a new flow request for requesting provisioning of a new flow between a computer and a server. In an exemplary embodiment, a computer 102 and/or server 104 may communicate a new flow request (e.g., call admission control (CAC) request) to the operation support system (OSS) 106. The method 200 may continue to block 204.

In block 204, the method 200 may include identifying a path between the computer 102 and the server 104. In an exemplary embodiment, the operation support system (OSS) 106 may identify one or more paths between the computer 102 and the server 104. Also, in dynamically provisioned networks, the operation support system (OSS) 106 may provision the end point network elements 108 on the network, and the end point network elements 108 may then signal available bandwidth end-to-end across the intermediate network elements 108 between the computer 102 and the server 104 to identify one or more paths, as opposed to the operation support system (OSS) 106 identifying one or more paths. In an exemplary embodiment, available bandwidth on each of the MPLS interfaces of the network elements 108 may be signaled via OSPF-TE to other network elements 108 in the network, so that each network element 108 in the network has entries for all MPLS interfaces in its traffic engineering database 114. The operation support system (OSS) 106 may determine whether sufficient bandwidth is available for the new flows across network elements 108-1 and 108-3. If sufficient bandwidth is available, the network elements 108-1 and 108-3 may then signal the bandwidth to the intermediate network element 108-2, which may perform new flow provisioning processing at the intermediate network element 108-2. The method 200 may continue to block 206.

In block 206, the method 200 may include determining whether provisioning a new flow would violate a constraint. In an exemplary embodiment, for statically provisioned paths, the operation support system (OSS) 106 may determine whether adding the new flow would violate the Constraint equation for any of the network elements 108 on the identified path. In dynamically provisioned networks, one or more of the network elements 108 on the identified path may individually determine whether adding the new flow would violate the Constraint equation. The method 200 may continue to block 208.

In block 208, the method 200 may include determining whether the constraint is satisfied. In an exemplary embodiment, for statically provisioned paths, the operation support system (OSS) 106 may determine whether the constraint is satisfied at all network elements 108 on the identified path. In dynamically provisioned networks, one or more of the network elements 108 may determine whether the constraint is satisfied at all network elements 108 on the identified path. If the constraint is satisfied, the method 200 may continue to block 210. If the constraint is not satisfied, the method 200 may continue to block 214.

In block 210, the method 200 may include updating the oversubscription factor. In an exemplary embodiment, for statically provisioned paths, the operation support system (OSS) 106 may calculate and update the traffic database 114 of each network element 108 to include the new oversubscription factor. In dynamically provisioned networks, one or more of the network elements 108 may calculate and update the traffic database 114 of each network element 108 to include the new oversubscription factor n, and/or the network elements 108 may individually calculate and update the traffic database 114 to include the new oversubscription factor. The method 200 may continue to block 212.

In block 212, the method 200 may include provisioning the new flow across the path between the computer and the server. In an exemplary embodiment, the operation support system (OSS) 106 may allocate the bandwidth to provision the new flow and may communicate a provisioned message to the computer 102, thereby informing the computer 102 that the new flow has been provisioned and may be used to communicate with the server 104. This branch of the method 200 may then end. Returning to block 208, if the constraint is not satisfied, the method 200 may continue to block 214.

In block 214, the method 200 may include determining whether an alternative path exists between the computer 102 and the server 104. In an exemplary embodiment, the operation support system (OSS) 106 and/or one or more of the network elements 108 may examine whether another path exists between the computer 102 and the server 104. For example, the operation support system (OSS) 106 and/or one or more of the network elements 108 may use a routing protocol to determine whether a suitable alternate path exists. If an alternative path exists, then the method 200 may return to block 206. If an alternative path does not exist, then the method 200 may continue to block 216.

In block 216, the method 200 may include generating a reject new flow message. In an exemplary embodiment, the operation support system (OSS) 106 and/or one of the network elements 108 may communicate a reject new flow message to the computer 102 and/or the server 104 that generated the new flow request indicating that a new flow cannot be provisioned at this time. This branch of the method 200 may then end.

Figure 3:
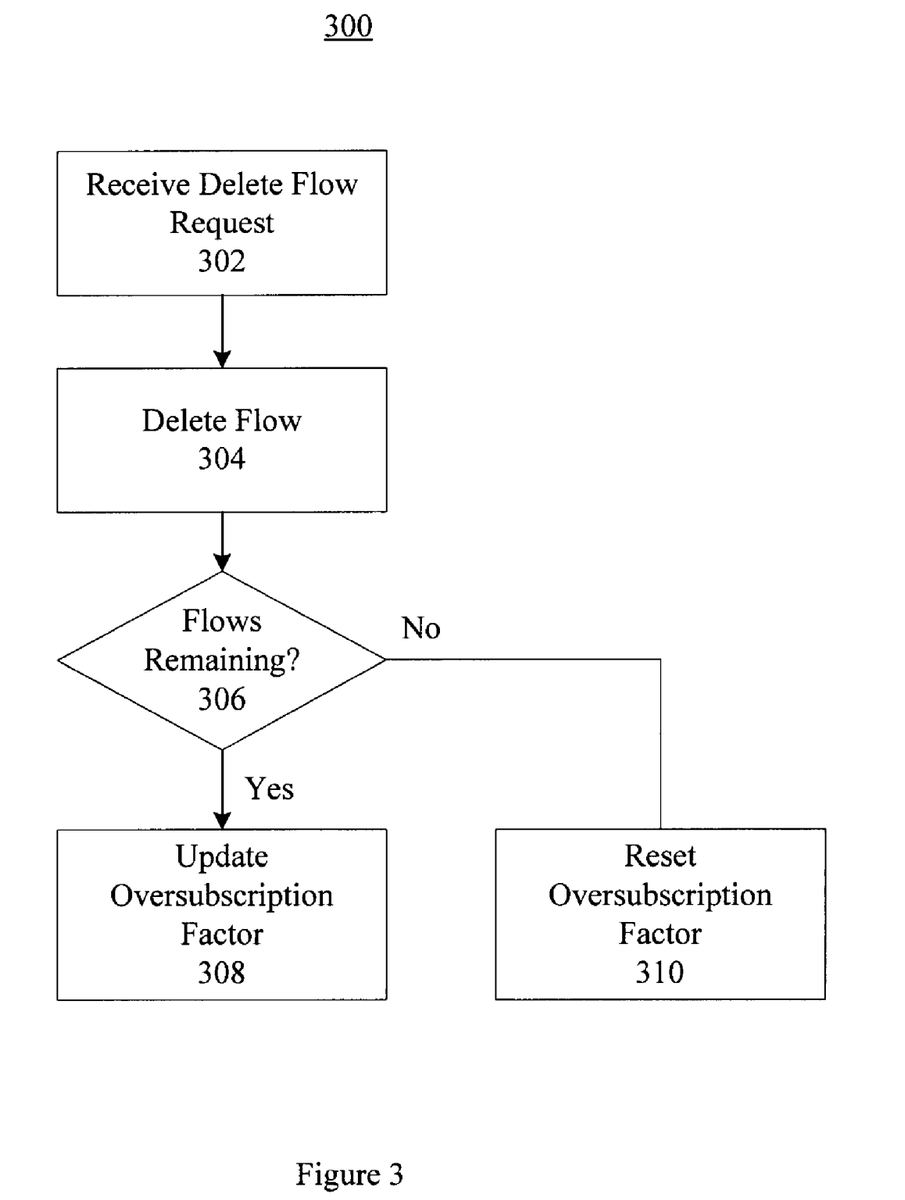
FIG. 3 illustrates a method for deleting a provisioned flow in accordance with exemplary embodiments.

FIG. 3 illustrates a method for deleting a provisioned flow in accordance with exemplary embodiments. This exemplary method is provided by way of example, as there are a variety of ways to carry out methods disclosed herein. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. Referring to FIG. 3, the exemplary method 300 may begin at block 302.

In block 302, the method 300 may include receiving a delete flow request. In an exemplary embodiment, the operation support system (OSS) 106 and/or one or more of the network elements 108 may receive a delete flow request from the computer 102 and/or the server 104. The operation support system (OSS) 106 and/or one or more of the network elements 108 may communicate the delete flow request to all of the other network elements 108 on the path associated with the flow. The method 300 may continue to block 304.

In block 304, the method 300 may include deleting the identified flow associated with the delete flow request. In accordance with exemplary embodiments, the network element 108 may delete the flow associated with the delete flow request, thereby freeing up the network element's 108 resources. The method 300 may continue to block 306.

In block 306, the method 300 may include determining whether any flows are remaining. In an exemplary embodiment, the operation support system (OSS) 106 and/or each of the network elements 108 may determine whether the network elements 108 have any other provisioned flows. If other flows are remaining, the method 300 may continue to block 308. If no flows are remaining, the method 300 may continue to block 310.

In block 308, the method 300 may include updating the oversubscription factor. In an exemplary embodiment, the operation support system (OSS) 106 and/or each of the network elements 108 may update the oversubscription factor n based on the remaining flows. This branch of the method 300 may then end. Returning to block 306, the method 300 may continue to block 310 in the event that no other flows are remaining.

In block 310, the method 300 may include resetting the oversubscription factor. In an exemplary embodiment, the operation support system (OSS) 106 may communicate a reset message to the network elements 108 to reset the oversubscription factor stored in the respective traffic databases 114 when no other flows are provisioned across the interfaces of those network elements 108. Also, the provisioning modules 110 of the network elements 108 having no flows provisioned across the interfaces may individually reset the oversubscription factor in the respective traffic databases 114. This branch of the method 300 may then end.

The following provides various examples of determining whether adding a new flow would violate a constraint and calculating an oversubscription factor in accordance with exemplary embodiments. As discussed above, the variable L may represent the rate of a particular interface of a network element 108, the variable x may represent the large flow oversubscription factor, the variable z may represent the small flow oversubscription factor, and the variable n may represent the oversubscription factor calculated based on adding a new flow to the previously provisioned flows.

Example 1

In example 1, the interface rate L=1000 Mbps, the large flow oversubscription factor x=1, the small flow oversubscription factor z=2, and all flows other than the largest flow are considered small flows. In this example, the single largest flow is not oversubscribed, and all remaining flows are oversubscribed at 2:1. If the largest flow is 500 Mbps, then the sum of the largest flows is 500 Mbps. The Constraint equation may then be solved to determine the maximum permissible value for the sum of the smallest flows SF. Applying the constraint equation yields:

$$\frac{500 \ Mbps}{x} + \frac{\sum_{m=0}^{p} SF_m}{z} \leq L$$

Solving for $$\sum_{m=0}^{p} SF_m$$

provides:

$$\sum_{m=0}^{p} SF_m \leq z\left(L - \frac{500 \ Mbps}{x}\right) \leq 2\left(1000 \ Mbps - \frac{500 \ Mbps}{1}\right) \leq 1000 \ Mbps$$

Thus, the sum of all the small flow rates may be less than 1000 Mbps to satisfy the Constraint equation. Accordingly, the maximum oversubscription factor for the interface of the network element is:

$$n_{\max} = \frac{\sum_{i=0}^{n} LF_i + \sum_{m=0}^{p} SF_m}{L} = \frac{500 \ Mbps + 1000 \ Mbps}{1000 \ Mbps} = 1.5$$

If, for example, the sum the small flows SF is 400 Mbps, then an additional 600 Mbps of bandwidth may be allocated to other small flows (i.e., 1000 Mbps−400 Mbps=600 Mbps).

Example 2

Continuing example 1, if a new flow request is received that requests to add an additional 600 Mbps flow, the new flow could not be provisioned as adding a 600 Mbps flow would not satisfy the Constraint equation because $$\frac{\sum_{i=0}^{n} LF_i}{x} + \frac{\sum_{m=0}^{p} SF_m}{z}$$

would be greater than L. In this example, the rate a defining the boundary between large and small flows is the flow having the largest flow rate. Hence, $$\sum_{i=0}^{n} LF_i$$

would increase from 500 Mbps to 600 Mbps and the 500 Mbps would be considered a small flow. Then:

$$\sum_{m=0}^{p} SF_m = 400 \; Mbps + 500 \; Mbps = 900 \; Mbps$$

Considering the Constraint equation:

$$\frac{\sum_{i=0}^{n} LF_i}{x} + \frac{\sum_{m=0}^{p} SF_m}{z} = \frac{600}{1} + \frac{900}{2} = 1050 \; Mbps$$

This result is larger than the 1000 Mbps rate of the interface of the network element 108, and hence the new flow request to add a 600 Mbps flow violates the Constraint equation. Thus, the new flow request would be denied.

Determining whether to provision new flows based on analyzing the Constraint equation also may be applied to a link aggregation environment, such as, but not limited to, the IEEE Std. 802.3-2005 Clause 43 Link Aggregation standard, the contents of which are incorporated herein by reference in their entirety. Other link aggregation standards instead of or in addition to the IEEE Std. 802.3-2005 Clause 43 Link Aggregation standard also may be used. Link aggregation permits use of multiple links in parallel to increase the amount of data communicated between two devices beyond what could be communicated using a single link.

Figure 4:
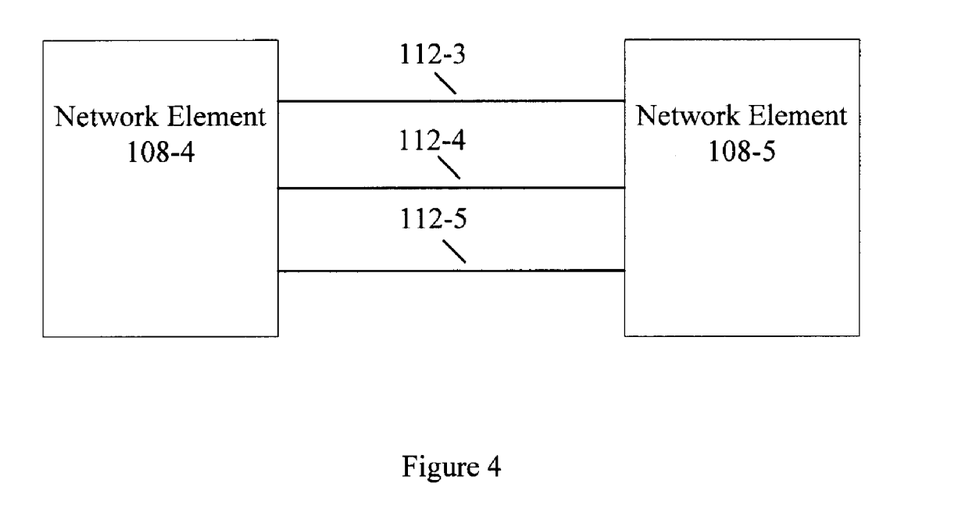
FIG. 4 illustrates a link aggregation environment having multiple links between network elements in accordance with exemplary embodiments.

FIG. 4 illustrates a link aggregation environment having multiple links between network elements in accordance with exemplary embodiments. Links 112-3, 112-4, and 112-5 are depicted between network element 108-4 and network element 108-5. It is noted that FIG. 4 illustrates three links 112 between network element 108-4 and network element 108-5. Link aggregation may be implemented, however, with two or more links positioned between two devices (e.g., between a network element and a server, between a first network element and a second network element, etc.).

The system 100 in accordance with exemplary embodiments may improve flow provisioning in link aggregation environments. Conventionally, link aggregation environments, such as IEEE Std. 802.3-2005 Clause 43 Link Aggregation, randomly provision flows to the links 112. For example, the operation support system (OSS) 106 and/or the network element 108 may randomly assign a new flow to one of links 112-3, 112-4, and 112-5. If several small flows are randomly distributed across the links 112, then the flows are likely to be uniformly assigned to the different links 112.

Problems can occur in link aggregation environments when the bandwidth of the flows increase and approach a certain percentage (e.g., greater than fifty percent) of the rate of the interface of the network element 108. For example, if each link 112 has a rate of one gigabit per second (Gbps), and three separate one gigabit per second flows are provisioned, if the flows are randomly assigned to the links 112-3, 112-4, and 112-5, then there is a probability that two of the three separate one gigabit per second flows may be provisioned to the same link (e.g., two separate one gigabit per second flows are provisioned to link 112-4), and none of the three separate one gigabit per second flows may be provisioned to one of the links. This may lead to one of the three links 112 not being utilized, and one of the three links 112 being overutilized resulting in latency and/or packet loss.

To overcome the problems associated with random assignment of flows to links, the system 100 may utilize the Constraint equation discussed above to intelligently determine whether to assign new flows to each of the links 112-3, 112-4, and 112-5 between network element 108-4 and network element 108-5. For example, as described above, as $$\frac{\sum_{i=0}^{n} LF_i}{x} \rightarrow L, \text{ then } n \rightarrow \frac{\sum_{i=0}^{n} LF_i + \sum_{m=0}^{p} SF_m}{L} = x,$$

which is the large flow oversubscription factor. Thus, if x=1 and three separate one gigabit per second flows may be provisioned to one of the three links 112 having a one gigabit per second rate from FIG. 4, the Constraint equation would prevent more than one of the three separate one gigabit per second flows from being provisioned on one of the three one gigabit per second rate links 112. Accordingly, using the Constraint equation to provision flows may improve utilization of the links 112 in a link aggregation environment, and may reduce the potential for latency and/or data loss.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   receiving a new flow request, the new flow request for requesting provisioning of a flow between a computer and a server;
   identifying a path of one or more network elements between the computer and the server, each of the one or more network elements comprising an interface;
   determining whether provisioning the flow between the computer and the server violates a constraint, wherein the constraint is based on at least one of:
   a large flow oversubscription factor, wherein a large flow is a flow larger than a specified percentage of a maximum interface rate of an interface; and
   a small flow oversubscription factor, wherein a small flow is a flow smaller than a specified percentage of a maximum interface rate of an interface;
   in the event the constraint is not violated, updating an oversubscription factor and available bandwidth for the interface of each of the one or more network elements in the path based at least in part on the new flow request; and
   in the event the constraint is violated, determining whether a second path exists between the computer and the server.

2. The method of claim 1, wherein the constraint is based on an interface rate of at least one of the interfaces.

3. The method of claim 2, wherein the constraint is associated with a relationship between a sum of all large flows relative to a small flow oversubscription factor and a sum of all small flows relative to a large flow oversubscription factor being less than or equal to the interface rate.

4. The methods of claim 2, wherein the interface rate is the rate of the largest flow across at least one of the one or more network elements.

5. The method of claim 3, wherein the large flow oversubscription factor is less than the small flow oversubscription factor.

6. The method of claim 1, wherein the oversubscription factor is based on a sum of all flows across at least one of the interfaces of the one or more network elements and on an interface rate of the at least one of the interfaces.

7. The method of claim 1, wherein the constraint is based on a large flow oversubscription factor.

8. The method of claim 1, wherein the constraint is based on a small flow oversubscription factor.

9. The method of claim 1, wherein the oversubscription factor varies based on a number of large flows and a number of small flows provisioned across at least one of the interfaces of the one or more network elements.

10. The method of claim 1, wherein the determining of whether provisioning the flow between the computer and the server would violate a constraint determines whether a relationship between the flows provisioned across at least one of the interfaces of the one or more network elements is greater than or equal to an interface rate of the at least one of the interfaces.

11. The method of claim 1, where in the event that a second path does not exist, communicating a reject new flow message.

12. The method of claim 1, wherein the constraint is $$\frac{\sum_{i=0}^{n} LF_i}{x} + \frac{\sum_{m=0}^{p} SF_m}{z} \leq L.$$

13. The method of claim 1, wherein the oversubscription factor is $$n = \frac{\sum_{i=0}^{n} LF_i + \sum_{m=0}^{p} SF_m}{L}.$$

14. The method of claim 1, wherein the path is identified using a routing protocol.

15. The method of claim 1, wherein the path is identified using a traffic engineering database.

16. A non-transitory computer readable media storing code to perform the acts of the method of claim 1.

17. A method comprising:
receiving a new flow request at a first network element from a second network element, the new flow request being usable to request provisioning of a new flow across an interface of the first network element;
determining whether provisioning the new flow violates a constraint, wherein the constraint is based on at least one of:
a large flow oversubscription factor, wherein a large flow is a flow larger than a specified percentage of a maximum interface rate of an interface; and
a small flow oversubscription factor, wherein a small flow is a flow smaller than a specified percentage of a maximum interface rate of an interface;
in the event the constraint is not violated, updating an oversubscription factor and bandwidth of the interface based at least in part on the new flow request, communicating an acceptance message to the second network element, and communicating the new flow request to a third network element; and
in the event the constraint is violated, communicating a deny new flow message to the second network element.

18. The method of claim 17, wherein the first network element updates bandwidth information in a traffic database if the constraint is not violated.

19. A computer readable media comprising code to perform the acts of the method of claim 17.

20. A system comprising:
a provisioning server communicatively coupled to a network;
a computer communicatively coupled to the network;
a communication server communicatively coupled to the network; and
a network element communicatively coupled to the network and comprising an interface,
wherein the provisioning server:
receives a new flow request, the new flow request for requesting provisioning of a flow between the computer and the communication server,
identifies a path including the network element between the computer and the communication server,
determines whether provisioning the flow between the computer and the server violates a constraint, wherein the constraint is based on at least one of:
a large flow oversubscription factor, wherein a large flow is a flow larger than a specified percentage of a maximum interface rate of an interface; and
a small flow oversubscription factor, wherein a small flow is a flow smaller than a specified percentage of a maximum interface rate of an interface;
in the event the constraint is not violated, the provisioning server updates an oversubscription factor and available bandwidth for the interface based at least in part on the new flow request; and
in the event the constraint is violated, the provisioning server determines whether a second path exists between the computer and the communication server.

21. A system comprising:
a provisioning server communicatively coupled to a network;
a computer communicatively coupled to the network;
a communication server communicatively coupled to the network;
a first endpoint network element communicatively coupled to the network and comprising an interface;
an intermediate network element communicatively coupled to the network,
wherein the provisioning server receives a new flow request and communicates the new flow request to the first endpoint network element, the new flow request for requesting provisioning of a new flow between the computer and the communication server,
wherein the first endpoint network element determines whether provisioning the flow violates a constraint, wherein the constraint is based on at least one of:
a large flow oversubscription factor, wherein a large flow is a flow larger than a specified percentage of a maximum interface rate of an interface; and a small flow oversubscription factor, wherein a small flow is a flow smaller than a specified percentage of a maximum interface rate of an interface;

in the event the constraint is not violated, the first endpoint network element updates an oversubscription factor and available bandwidth of the interface based at least in part on the new flow request, and communicates the new flow request to the intermediate network element; and in the event the constraint is violated, the first endpoint network element communicates a deny new flow message to the provisioning server.

\* \* \* \* \*